United States Patent
Schweiger

[11] Patent Number: 5,818,330
[45] Date of Patent: Oct. 6, 1998

[54] ANTI-THEFT SYSTEM FOR A MOTOR VEHICLE

[75] Inventor: Jürgen Schweiger, Regensburg, Germany

[73] Assignee: Siemens Aktiengesellschaft, Munich, Germany

[21] Appl. No.: 902,681

[22] Filed: Jul. 30, 1997

(Under 37 CFR 1.47)

[30] Foreign Application Priority Data

Jul. 30, 1996 [DE] Germany .................. 196 30 747.3

[51] Int. Cl.⁶ ................................ B60R 25/10
[52] U.S. Cl. .............. 340/426; 340/425.5; 123/179.2; 180/167; 180/287; 307/10.2; 307/10.3; 307/10.4; 307/10.5
[58] Field of Search ................. 340/426, 425.5, 340/428, 429, 430, 576, 543; 307/10.2, 10.3, 10.4, 10.5, 10.6, 9.1, 10.1; 180/287, 167; 123/179.2, 198 B, 146.5 B; 290/38 C, 38 E, 36 A

[56] References Cited

U.S. PATENT DOCUMENTS

| | | | |
|---|---|---|---|
| 4,080,537 | 3/1978 | Bucher | 123/179.2 |
| 5,042,439 | 8/1991 | Tholl et al. | 180/167 |
| 5,184,584 | 2/1993 | Cantrell | 123/179.2 |
| 5,519,376 | 5/1996 | Iijima | 340/426 |
| 5,610,574 | 3/1997 | Mutoh et al. | 340/426 |
| 5,612,578 | 3/1997 | Drew | 307/10.5 |
| 5,673,017 | 9/1997 | Dery et al. | 340/426 |

FOREIGN PATENT DOCUMENTS

| | | |
|---|---|---|
| 0659963A1 | 6/1995 | European Pat. Off. . |
| 4333474A1 | 2/1995 | Germany . |
| 4329697A1 | 3/1995 | Germany . |

*Primary Examiner*—Nina Tong
*Attorney, Agent, or Firm*—Herbert L. Lerner; Laurence A. Greenberg

[57] ABSTRACT

An anti-theft system for a motor vehicle includes a portable code transmitter which transmits a code signal from a distance upon actuation. A receiver unit in the motor vehicle receives the code signal and evaluates it. Upon authorization, only the engine is started, but the vehicle does not have to be unlocked. A further code signal is required in order to drive the vehicle. However, it must be generated in the vehicle interior. Thus the engine can already warm up without the user being located in the vicinity of the vehicle.

11 Claims, 2 Drawing Sheets

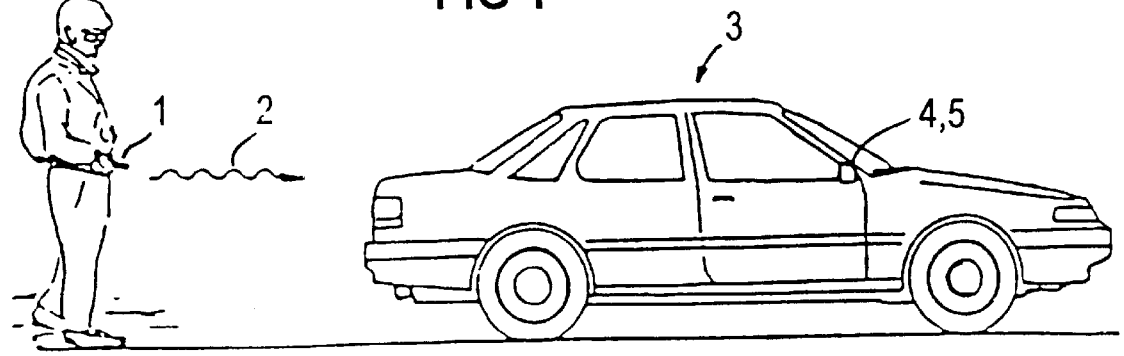
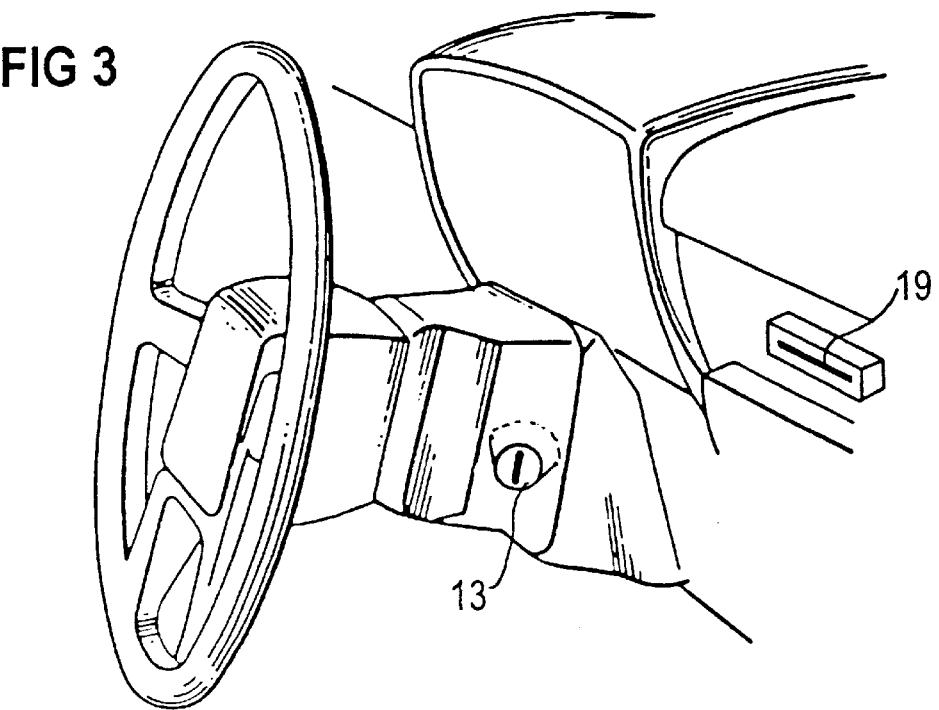

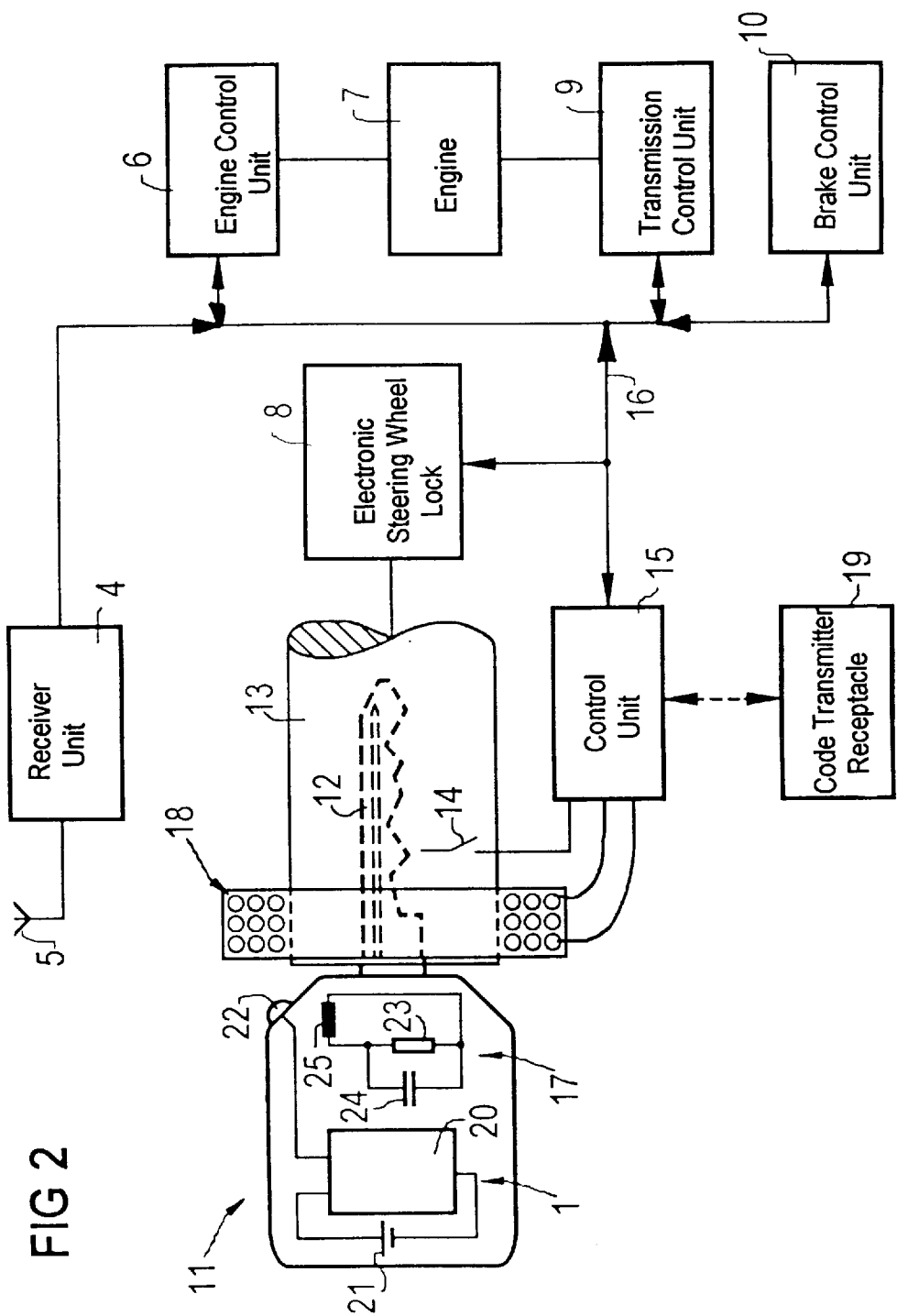

ANTI-THEFT SYSTEM FOR A MOTOR VEHICLE

BACKGROUND OF THE INVENTION

1. Field of the Invention:

The invention relates to an anti-theft system for a motor vehicle, in particular an electronic immobilizer, with which use of the motor vehicle is allowed only upon proof of authorization.

In anti-theft systems, such as those known from German Published, Non-Prosecuted Patent Applications DE 43 33 474 A1 and DE 43 29 697 A1 or Published European Patent Application 0 659 963 A1, a motor vehicle is unlocked by a code signal transmitted wirelessly to the vehicle. As soon as an ignition key is inserted into an ignition lock and turned, a further code signal is transmitted from the key to the lock. If the code signal agrees with a desired code signal then the engine is started and the vehicle can be moved.

In a motor vehicle with such an anti-theft system, if one wants to let the engine run for a while before driving away, such as during winter, then the ignition key must be in the ignition lock. However, the danger is that the motor vehicle may be stolen if the user is not in or near his or her vehicle.

2. Summary of the Invention:

It is accordingly an object of the invention to provide an anti-theft system for a motor vehicle, which overcomes the hereinafore-mentioned disadvantages of the heretofore-known devices of this general type and with which starting of an engine by remote control is made possible.

With the foregoing and other objects in view there is provided, in accordance with the invention, an anti-theft system for a motor vehicle, comprising a portable first code transmitter having a transmitter unit transmitting a coded engine starting signal upon actuation; a receiver unit in a motor vehicle for receiving the engine starting signal, comparing the engine starting signal with an expected desired code signal and generating a control signal for starting an engine if the two signals agree; and a central control unit in the motor vehicle for enabling use or driving of the vehicle only if an enable signal received by the control unit has agreed beforehand with an expected desired enable signal; the enable signal being generated by the first code transmitter or by a further code transmitter generating the enable signal when the further code transmitter is located in the interior of the vehicle.

In accordance with another feature of the invention, the further code transmitter is a transponder disposed on a grip portion of a conventional door/ignition key, the transponder generating the enable signal as a consequence of a request signal received by the control unit.

In accordance with a further feature of the invention, the first code transmitter is also disposed on a conventional, mechanical door/ignition key.

In accordance with an added feature of the invention, the enable signal or the engine starting signal is transmitted as a radio signal, optical signal, or acoustical signal.

In accordance with an additional feature of the invention, there is provided an ignition switch turned on by turning a door/ignition key in an ignition lock for generating the enable signal.

In accordance with yet another feature of the invention, there is provided a data bus connecting the control unit to at least one of an engine control unit, a transmission control unit, an electronic steering wheel lock and a brake control unit.

In accordance with yet a further feature of the invention, at least one of the control unit and the receiver unit is part of an engine control unit, and there is provided a receiving antenna electrically connected to the engine control unit for receiving the enable signal.

With the objects of the invention in view there is also provided an anti-theft system for a motor vehicle, comprising a portable code transmitter having a transmitter unit transmitting an engine starting signal to a vehicle upon actuation; and a receiver unit in the motor vehicle for receiving the engine starting signal, comparing the engine starting signal with an expected desired code signal, and generating a control signal for starting an engine if the two signals agree, while still blocking use of the vehicle.

A portable coded transmitter sends an engine starting signal to the vehicle. In the vehicle, the engine starting signal is checked for its authorization and upon authorization a starting signal for starting the engine is generated. However, it is advantageous that the vehicle doors can remain locked. Moreover, at that moment the vehicle cannot yet be used or driven since those functions are still blocked. The user can conveniently send the engine starting signal to his or her vehicle from a distance.

The vehicle cannot be moved until a coded enable signal is received. This enable signal, however, can be tripped only by a code transmitter in a vehicle interior.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-elevational view of a motor vehicle and its user;

FIG. 2 is a block circuit diagram of an anti-theft system for a motor vehicle according to the invention; and FIG. 3 is a fragmentary, perspective view of a vehicle interior in the vicinity of a steering wheel.

DESCRIPTION OF THE PREFERRED EMBODIMENTS

In an anti-theft system for a motor vehicle according to the invention, an internal combustion engine of the vehicle can be started by remote control. Thus it is possible to warm up the engine while the user is still busy elsewhere, for instance if he or she is still eating his or her breakfast on a winter morning.

Referring now to the figures of the drawings in detail and first, particularly, to FIG. 1 thereof, it is seen that in order to start an engine, a user actuates a portable first code transmitter 1, which thereupon transmits an engine starting signal 2 to a motor vehicle 3. A receiver unit 4, which is disposed in the vehicle 3 and is also shown in FIG. 2, can receive signals from outside the vehicle 3 only when a receiving antenna 5 associated therewith is disposed on an outer mirror, as is shown in FIG. 1, or on an inside mirror with an outward-oriented reception characteristic, or at some other central point on the outside of the vehicle 3.

The receiver unit 4 receives the engine starting signal 2 and evaluates it. To that end, it compares the engine starting signal 2 with an expected, desired signal that is stored in memory. If the two signals agree, a control signal is sent to an engine control unit 6, a non-illustrated ignition control unit, and/or a control unit for turning on a delivery of fuel in the vehicle, with the sole result that an engine 7 is merely started.

The vehicle 3 cannot yet be moved at this moment, since other control units of the vehicle 3, such as a mechanical or electronic steering wheel lock 8, a transmission control unit 9, a brake control unit 10, or functionally equivalent control units are still blocked.

Once the engine 7 has started, then the engine control unit 6 can take on idling control of the engine 7, so that the engine 7 will not "die" as it is warming up. An actuated hand brake or the brake control unit 10 assures that the vehicle 3 will not roll away.

In addition, after the engine 7 is started, a heater, blower or air conditioner of the vehicle 3 can be turned on so that the interior of the vehicle 3 will warm up or cool down.

The vehicle 3 need not be unlocked for starting the engine 7. It suffices merely for the engine starting signal 2, which is transmitted from the first code transmitter 1 outside the vehicle 3, to be received and evaluated by the receiver unit 4. The receiver unit 4 thereupon generates the control signal, which initiates only the engine starting but does not enable driving of the vehicle 3.

If the user then wants to drive away with the vehicle, he or she has to enter the vehicle 3 and generate an enable signal there.

As is seen in FIG. 2, the enable signal is generated, for instance, by inserting a door/ignition key 11 with a mechanical coding or key bit 12 into an ignition lock 13 and turning. When the key 11 is turned, a mechanical steering wheel lock that is typically present in the motor vehicle is released and an ignition switch 14 is turned on, as a result of which the enable signal is generated in a central control unit 15. As a consequence of the enable signal, all of the control units, such as the engine control unit 6, the transmission control unit 9, the brake control unit 10, etc., are enabled with the aid of a control signal.

The enable signal, which is generated by switching the ignition switch 14, is a coded signal and is evaluated in the central control unit 15. In other words, upon authorization a corresponding control signal is generated and is transmitted over a data bus 16 to the corresponding control units 6, 8, 9, 10. However, the ignition switch 14 can be switched only when the ignition key 11 fits the ignition lock 13, or in other words when the mechanical coding of the ignition key 11 agrees with the coding of the ignition lock 13.

However, a second portable code transmitter 17, such as a transponder, may also be provided. When the ignition key 11 is turned in the ignition lock 13, the second portable code transmitter 17 sends the enable signal inductively to a transceiver unit 18 in the form of a coil around the ignition key 13. The enable signal is checked for its authorization in the central control unit 15 and upon authorization, the control unit 15 sends a control signal to all of the units 6, 8, 9, 10 which are connected to it in order to enable the vehicle 3 to be driven.

If a transponder is used as the code transmitter 17, then it first transmits an enable signal when the transponder has received a suitable request signal beforehand. The request signal is tripped, for instance, by turning the ignition key 11 in the ignition lock 13 or by actuating a start button that is present instead of the ignition lock 13.

The second code transmitter 17 may be constructed as a conventional hand-held transmitter, which is disposed on the grip part of the ignition key 11 or on a credit-card-sized card. The second code transmitter 17 may also have a button, upon the actuation of which the enable signal is transmitted. However, the enable signal can be received by the transceiver unit 18 only whenever the second code transmitter 17 is located in the interior of the vehicle 3.

To that end, the reception characteristic of the transceiver unit 18 may be configured in such a way that signals can be received only in the interior. To that end, the transceiver unit 18 is constructed as directional antennas having directional characteristics with tight focusing, or in other words with a very small space angle, or else they all have their directional antennas aimed at the interior but not at the exterior.

Alternatively, the second code transmitter 17 may be constructed in such a way that it transmits only signals with a very short range (approximately 1 to 2 m), which are consequently received by the transceiver unit 18 only when the code transmitter 17 is located quite near the transceiver unit 18 in the vehicle interior. If signals were transmitted by such code transmitters 17 from outside the vehicle 3, then no signal would reach the interior, because of the damping properties of the vehicle body and its windows.

The second code transmitter 17 may also be constructed as a magnetic strip card or chip card. In order to drive the vehicle, the second code transmitter 17 would then be inserted into a code transmitter receptacle 19 on the dashboard as is seen in FIG. 3 or in a console in the interior of the vehicle. The enable signal, which is stored in memory on the card or is generated there, is read by a reading device. Since the code transmitter receptacle 19 is electrically connected to the central control unit 15, driving of the vehicle 3 is made possible if the enable signal is authorized.

The first code transmitter 1, which transmits the engine starting signal 2 to start the engine 7, may be independent of the second code transmitter 17 that transmits the enable signal for driving of the vehicle 3. As is shown in FIG. 2, the first code transmitter 1 and the second code transmitter or transponder 17 are disposed together, but independently on the grip part of the ignition key 11.

The first code transmitter 1 has a transmitting unit 20, which is supplied with energy from a battery 21. Upon actuation of a non-illustrated button, the engine starting signal 2 is generated and transmitted through a transmitting antenna 22. The second code transmitter 17 has a code generator 23, which is supplied with energy from an energy storage device 24, for instance in the form of a capacitor.

When the ignition key 11 is turned in the ignition lock 13, a request signal (or energy signal) is transmitted by the transceiver unit 18 around the ignition lock 13, and this signal causes the second code transmitter 17 to send its enable signal in return back to the transceiver unit 18 through a transmitting element (in the form of a coil in the case of the transponder). The enable signal is evaluated in the control unit 15 and upon authorization (that is, if there is at least predominant agreement with an expected, desired signal which is stored in memory), the control units 6, 8, 9, 10 which are connected thereto are enabled.

The first code transmitter 1 and the second code transmitter 17 may be constructed identically. The engine starting signal 2 may also agree with the enable signal, in which case only a single code transmitter 1, 17 is needed. In that case, the code transmitter 1, 17 must be actuated from outside the vehicle 3 in order to start the engine 7 and then once again in the vehicle 3 to allow it to be driven.

However, the engine 7 is started only when an authorized signal is received from outside the vehicle 3. In order to drive the vehicle 3, it is necessary that the user, with his or her code transmitter 1, 17, be located inside the vehicle 3. If the engine 7 is not yet running and the user is already in the vehicle 3, then the enable signal also turns on the ignition so that the engine 7 can be started. In such a case, the enable signal must not be generated by the ignition switch 14. Instead, the electronic signal must be generated by the code generator 23 of the code transmitter 17.

The user can insert the ignition key 11 into the ignition lock 13 and turn it, whereupon the enable signal is generated. However, he or she can also insert the code transmitter 17 into the code transmitter receptacle 19, once again causing the enable signal to be generated. It is also possible for him or her to actuate the ignition switch 14 mechanically, whereupon a request signal is sent to the code transmitter 17, which thereupon returns the enable signal. The code transmitter 17 may also be carried in a shirt or pants pocket or handbag. The user may also actuate a button of the code transmitter 17 when he or she is inside the vehicle 3, whereupon the enable signal is sent to the transceiver unit 18 of the control unit 15. The electronic steering wheel lock 8 can be released and/or the other control units 6, 8, 9, 10 can be enabled through the use of the enable signal.

In order to start the engine 7, it suffices for the user to send the engine starting signal 2 to the vehicle 3 from some distance away, using the first code transmitter 1. The distance from the vehicle 3 depends on the range of the engine starting signal 2. The range, conversely, is dependent on the mode of transmission and on the transmission power, among other factors. For instance, the engine starting signal 2 can be carried by high-frequency radio signals, by optical signals, or by acoustical signals. Inductive low-frequency signals (signals transmitted through the use of transformer coils) are also suitable for transmitting the code signal, but their ranges are quite limited. It is therefore more advantageous to use other modes of transmission.

The enable signal can likewise be sent to the control unit 15 by way of radio signals, optical or acoustical transmission, and inductive, low-frequency transmission. Contact-type transmission and generation of the enable signal is also possible. Inductive transmission is especially attractive for the enable signal, since its range is at maximum from only one to two meters.

The receiver unit 4 and the central control unit 15 may also be disposed in a single control unit 6, 8, 9, 10 that is present anyway in the vehicle 3. For instance, the use of the engine control unit 6, in which these two units are integrated, is suitable. In that case, however, the engine control unit 6 must be electrically connected directly to the receiving antenna 5 for receiving the engine starting signal 2.

Once the engine starting signal 2 has been received, the engine 7 is started, and once the enable signal is received the vehicle can be driven as desired by the user. The receiver unit 4, the control unit 15, and the control units (engine control unit 6, transmission control unit 9, ignition control unit, brake control unit 10, steering wheel lock 8) can also be connected to one another through the data bus 16.

All of the signals (engine starting signal 2, enable signal, control signal) are binary-coded signals. In order to provide wireless transmission, they are modulated in a known manner and demodulated on the receiving side. The anti-theft system according to the invention can therefore not be circumvented by deception merely by applying a direct voltage to the data bus 16 in order to start the engine 7 or enable the control units. It is only once the engine starting signal 2 has been recognized as authorized, that the engine 7 started. It is only if the enable signal is recognized as authorized that the coded control signal generated, which in turn enables the respective control unit 6, 8, 9, 10 only whenever it is correctly received from that control unit.

I claim:

1. An anti-theft system for a motor vehicle, comprising:
   a portable code transmitter having a transmitter unit transmitting a coded engine starting signal upon actuation;
   a receiver unit in a motor vehicle for receiving the engine starting signal, comparing the engine starting signal with an expected desired code signal and generating a control signal for starting an engine if the two signals agree; and
   a central control unit in the motor vehicle for enabling use or driving of the vehicle only if an enable signal received by the control unit has agreed beforehand with an expected desired enable signal.

2. The anti-theft system according to claim 1, wherein the enable signal is generated by said code transmitter.

3. The anti-theft system according to claim 2, wherein said code transmitter is disposed on a mechanical door/ignition key.

4. The anti-theft system according to claim 3, including a further code transmitter disposed on a key for generating the enable signal when said further code transmitter is located in the interior of the vehicle.

5. The anti-theft system according to claim 1, including a further code transmitter generating the enable signal when said further code transmitter is located in the interior of the vehicle.

6. The anti-theft system according to claim 5, wherein said further code transmitter is a transponder disposed on a grip portion of a door/ignition key, said transponder generating the enable signal as a consequence of a request signal received by said control unit.

7. The anti-theft system according to claim 1, wherein the enable signal is transmitted as a radio signal, optical signal, or acoustical signal.

8. The anti-theft system according to claim 1, wherein the engine starting signal is transmitted as a radio signal, optical signal, or acoustical signal.

9. The anti-theft system according to claim 1, including an ignition switch turned on by turning a door/ignition key in an ignition lock for generating the enable signal.

10. The anti-theft system according to claim 1, including a data bus connecting said control unit to at least one of an engine control unit, a transmission control unit, an electronic steering wheel lock and a brake control unit.

11. The anti-theft system according to claim 1, wherein at least one of said control unit and said receiver unit is part of an engine control unit, and including a receiving antenna electrically connected to said engine control unit for receiving the enable signal.

* * * * *